US010407343B2

(12) United States Patent
Nie et al.

(10) Patent No.: US 10,407,343 B2
(45) Date of Patent: Sep. 10, 2019

(54) METHOD OF PRODUCING GEOPOLYMER CEMENT UTILIZING DESULFURIZED RED MUD

(71) Applicants: University of Tennessee Research Foundation, Knoxville, TN (US); Hebei Research Institute of Construction and Geotechnical Investigation Co., Ltd., Shijiazhuang (CN)

(72) Inventors: Qingke Nie, Shijiazhuang (CN); Wei Hu, Knoxville, TN (US); Baoshan Huang, Knoxville, TN (US); Tao Ai, Xi'An (CN); Qiang He, Knoxville, TN (US); Xiang Shu, Knoxville, TN (US)

(73) Assignees: University of Tennessee Research Foundation, Knoxville, TN (US); Hebei Research Institute of Construction and Geotechnical Investigation Co., Ltd., Shijiazhuang (CN)

(*) Notice: Subject to any disclaimer, the term of this patent is extended or adjusted under 35 U.S.C. 154(b) by 78 days.

(21) Appl. No.: 15/612,677

(22) Filed: Jun. 2, 2017

(65) Prior Publication Data
US 2018/0346380 A1 Dec. 6, 2018

(51) Int. Cl.
*C04B 28/00* (2006.01)
*C04B 18/08* (2006.01)
*C04B 12/00* (2006.01)
*B01D 53/50* (2006.01)

(52) U.S. Cl.
CPC .......... *C04B 28/006* (2013.01); *B01D 53/50* (2013.01); *C04B 12/005* (2013.01); *C04B 18/08* (2013.01)

(58) Field of Classification Search
CPC ..... C04B 28/006; C04B 18/08; C04B 12/005; B01D 53/50
See application file for complete search history.

(56) References Cited

U.S. PATENT DOCUMENTS 5,601,643 A 2/1997 Silverstrim et al.
8,202,362 B2 6/2012 Davidovits et al.
9,321,681 B2 4/2016 Dubey

FOREIGN PATENT DOCUMENTS

CN 105601135 A * 5/2016
CN 105837067 A * 8/2016
CN 106116390 A * 11/2016

OTHER PUBLICATIONS

Davidovits, "Global Warming Impact on the Cement and Aggregates Industries," World Resource Review, vol. 6, No. 2, pp. 263-278 (1994).
Duxson et al., "Geopolymer technology: the current state of the art," Journal of Materials Science, vol. 42, No. 9, pp. 2917-2933 (2007).
He, "Synthesis and Characterization of Geopolymers for Infrastructural Applications," Ph.D. Dissertation, Nottingham University (115 pages) (Aug. 2012).
Jueshi et al., "Activation of blended cements containing fly ash," Cem. Concr. Res., vol. 31, No. 8, pp. 1121-1127 (2001).
Nie et al., "Strength properties of geopolymers derived from original and desulfurized red mud cured at ambient temperature," Construction and Building Materials, vol. 125, pp. 905-911 (2016).
Petermann et al., "Alkali-Activated Geopolymers: A Literature Review", DTIC Document (99 pages) (2010).
Zhang et al., "Synthesis, Characterization, and Mechanical Properties of Red Mud-Based Geopolymers," Transportation Research Record: Journal of the Transportation Research Board, No. 2167, Transportation Research Board of the National Academies, Washington, D.C., pp. 1-9 (Dec. 2010).
Chindaprasirt et al., "Workability and strength of coarse high calcium fly ash geopolymer," Cem. Concr. Compos. vol. 29, No. 3, pp. 224-229 (2007).
Diaz et al., "Factors affecting the suitability of fly ash as source material for geopolymers," Fuel, vol. 89. No. 5, pp. 992-996 (May 2010).
Dimas et al., "Utilization of Alumina Red Mud for Synthesis of Inorganic Polymeric Materials," Mineral Processing & Extractive Metallurgy Review, vol. 30, No. 3, pp. 211-239 (May 2009).
Hardjito et al., "Fly Ash-Based Geopolymer Concrete," Australian Journal of Structural Engineering, vol. 6, No. 1, pp. 77-86 (2005).
He et al., "The strength and microstructure of two geopolymers derived from metakaolin and red mud-fly ash admixture: A comparative study," Construction and Building Materials, vol. 30, pp. 80-91 (May 2012a).
Kumar et al., "Development of paving blocks from synergistic use of red mud and fly ash using geopolymerization," Construction and Building Materials, vol. 38, pp. 865-871 (Jan. 2013).
Pang et al., Analysis of Alumina Red Mud Wet Flue Gas Desulfurization (FGD) Technology, Advanced Materials Research, vol. 634-638, pp. 198-203 (2013).
Rattanasak et al., "Influence of NaOH solution on the synthesis of fly ash geopolymer," Miner. Eng., vol. 22, No. 12, pp. 1073-1078 (Oct. 2009).
Shi et al., Alkali-Activated Cements and Concretes, CRC Press (Dec. 22, 2005).
Temuujin et al., "Influence of Calcium Compounds on the Mechanical Properties of Fly Ash Geopolymer Pastes," J. Hazard. Mater., vol. 167, No. 1-3, pp. 82-88 (2009).

(Continued)

*Primary Examiner* — Anthony J Green
(74) *Attorney, Agent, or Firm* — Jenkins, Wilson, Taylor & Hunt, P.A.

(57) ABSTRACT

Red mud-based geopolymer compositions and methods of their preparation are described. The red mud-based geopolymer compositions can be cured at ambient temperatures using alkaline solutions of relatively low alkaline compound concentration compared to other geopolymer compositions. In particular, the use of a red mud previously utilized in a flue gas desulfurization process can provide high strength geopolymer compositions.

32 Claims, 7 Drawing Sheets

(56) References Cited

OTHER PUBLICATIONS

Van Riessen et al., "Bayer-geopolymers: an exploration of synergy between the alumina and geopolymer industries," Cem Concr. Compos., vol. 41, pp. 29-33 (2013).
Wu and Naik, "Chemically Activated Blended Cement," ACI Materials Journal, vol. 100, No. 5, pp. 434-440 (2003).

* cited by examiner

METHOD OF PRODUCING GEOPOLYMER CEMENT UTILIZING DESULFURIZED RED MUD

TECHNICAL FIELD

The presently disclosed subject matter relates to geopolymer compositions that comprise the reaction product of a reaction mixture comprising an alkaline solution, an alumina silicate material (e.g., Class C fly ash) and red mud, as well as to methods of preparing and using the geopolymer compositions. The red mud can be red mud that has been used as an acid neutralizing agent in a flue gas desulfurization process. The geopolymer compositions can be prepared using aqueous alkaline solutions comprising an alkali metal hydroxide and having a molarity of about 6 M or less and can be cured at ambient temperatures.

Abbreviations

° C.=degrees Celsius
%=percentage
µL=microliter
µm=microns
EMP=electron microprobe
FC=class C fly ash
FF=class F fly ash
FGD=flue gas desulfurization
g=grams
GPa=gigapascal
L=liter
M=molar
min=minute
mL=milliliter
mm=millimeter
mol=moles
MPa=megapascal
NaOH=sodium hydroxide
OPC=ordinary portland cement
RM=red mud
SEM=scanning electron microscopy
WDS=wavelength dispersive spectrometer
wt %=weight percentage
XRD=X-ray diffraction

BACKGROUND

Geopolymer is a cementitious material that has the potential to be an alternative to the ordinary portland cement (OPC). Unlike the mechanism of hydraulic and/or pozzolanic reactions for the formation of OPC, geopolymers can be prepared when source materials including an alumina silicate material (such as fly ash, slag, etc.) and an alkaline reagent (such as sodium or potassium hydroxide) react and form an inorganic polymer-like structure, which can serve as a binder. As described by Davidovits et al. in U.S. Pat. No. 8,202,362 B2, the geopolymer network includes $SiO_4$ and $AlO_4$ tetrahedrons alternatively bound by oxygen atoms. Cations present in structural cavities balance negative charges.

There is a rising interest in geopolymers due, at least in part, to increasing emphasis on sustainability. The production of one metric ton of hydraulic cement generates approximately 1 metric ton of carbon dioxide ($CO_2$). The production of geopolymeric cement releases 5 to 10 times less $CO_2$. See Davidovits, World Resource Review, 6(2), pp. 263-278 (1994). Geopolymers also have many other advantages over OPC, such as high strength, high temperature resistance, and acid resistance.

However, the production of geopolymers based on fly ash at ambient temperatures has proven to be a challenge. Previous geopolymer studies have indicated a possible temperature threshold and that strength development under the temperature threshold is too slow for civil engineering applications. See Hardiito et al., Australian Journal of Structural Engineering, 61(1), 77 (2005). Geopolymers are typically cured at temperatures ranging between 50 and 80° C. using added heat from an external source. Because the typical curing temperature is higher than ambient temperature, the utilization of geopolymer as a construction material is impeded. See Petermann et al., *Alkali-Activated Geopolymers: A Literature Review*, DTIC Document, 2010.

Accordingly, there is a need for additional geopolymer compositions and methods of production, particularly for geopolymer compositions that can be cured and/or that develop good strength at ambient temperatures. There is also an ongoing need for green building materials that can produce less waste and/or that can utilize waste products from other industries.

SUMMARY

In some embodiments, the presently disclosed subject matter provides a geopolymer composition comprising a reaction product of a reaction mixture comprising an alkaline solution and a solids mixture, wherein the solids mixture comprises red mud and an alumina silicate material, wherein the alumina silicate material comprises at least about 10 weight % (wt %) CaO and is selected from the group comprising Class C fly ash, lime-Class F fly ash, a blast furnace slag, and combinations thereof, and wherein the alkaline solution comprises an aqueous solution comprising at least one alkali metal hydroxide, optionally in combination with one or more additional alkaline compound. In some embodiments, the alumina silicate material comprises Class C fly ash comprising between about 15 wt % and about 21 wt % CaO.

In some embodiments, the aqueous solution comprises between about 1.5 moles per liter (mol/L) and about 6.5 mol/L of the alkali metal hydroxide. In some embodiments, the aqueous solution comprises between about 2.5 mol/L and about 3.5 mol/L of the alkali metal hydroxide. In some embodiments, the alkali metal hydroxide is sodium hydroxide.

In some embodiments, the reaction mixture comprises a weight ratio of alkaline solution to solids mixture of between about 0.4 and about 0.6. In some embodiments, the solids mixture has a weight ratio of red mud to alumina silicate material of between about 40:60 red mud:alumina silicate material and about 60:40 red mud:alumina silicate material. In some embodiments, the weight ratio is about 50:50 red mud:alumina silicate material.

In some embodiments, the red mud is a red mud that has been used in a flue-gas desulfurization (FGD) process. In some embodiments, the red mud has a pH of about 4.5. In some embodiments, the red mud comprises between about 2 wt % and about 3 wt % $SO_3$.

In some embodiments, the reaction product is prepared from a reaction mixture comprising a 3.5 M aqueous solution of NaOH and a solids mixture comprising red mud that has been used in a flue-gas desulfurization (FGD) process and a Class C fly ash, wherein said solids mixture comprises a red mud:fly ash weight ratio of about 50:50 and the reaction mixture has a solution:solids mixture weight ratio of about 0.5. In some embodiments, the reaction product is prepared from a reaction mixture comprising a 2.5 M aqueous solution of NaOH and a solids mixture comprising untreated red mud and Class C fly ash, wherein the solids mixture further comprises a red mud:fly ash weight ratio of about 50:50 and the reaction mixture has a solution:solids weight ratio of about 0.5. In some embodiments, the reaction product has a compressive strength of at least about 15 megapascals (MPa). In some embodiments, the reaction product has a compressive strength of at least about 20 MPa.

In some embodiments, the presently disclosed subject matter provides a method of preparing a geopolymer composition, the method comprising: (a) providing a solids mixture comprising an alumina silicate material and red mud, wherein the alumina silicate material comprises at least about 10 weight % (wt %) CaO and is selected from the group comprising Class C fly ash, lime-Class F fly ash, a blast furnace slag, and combinations thereof; (b) mixing the solids mixture with an alkaline solution to provide an uncured mixture, wherein the alkaline solution comprises an aqueous solution comprising at least one alkali metal hydroxide, optionally in combination with one or more additional alkaline compound; and (c) curing the uncured mixture for a period of time at ambient temperature to provide the geopolymer composition. In some embodiments, the period of time is at least about 24 hours. In some embodiments, the alumina silicate material comprises Class C fly ash comprising between about 15 wt % and about 21 wt % CaO.

In some embodiments, the red mud is a red mud that was used in a flue-gas desulfurization process prior to mixing with the fly ash. In some embodiments, the red mud has a pH of about 4.5. In some embodiments, the red mud comprises between about 2 wt % and about 3 wt % $SO_3$.

In some embodiments, the solids mixture has a weight ratio of between about 40:60 red mud:alumina silicate material and about 60:40 red mud:alumina silicate material. In some embodiments, the alkaline solution comprises between about 1.5 moles per liter (mol/L) of the alkali metal hydroxide and about 6.5 mol/L of the alkali metal hydroxide. In some embodiments, the alkaline solution comprises between about 2.5 mol/L and about 3.5 mol/L of the alkali metal hydroxide. In some embodiments, the alkali metal hydroxide is NaOH. In some embodiments, the uncured mixture has an alkaline solution to solids mixture weight ratio of about 0.5.

In some embodiments, the presently disclosed subject matter provides a cementitious binder mixture comprising: (i) a solids mixture comprising red mud and an alumina silicate material, wherein the alumina silicate material comprises at least about 10 weight % CaO; and (ii) an aqueous solution comprising an alkali metal hydroxide. In some embodiments, the presently disclosed subject matter provides a cementitious the mortar mixture comprising the binder mixture and further comprising fine aggregate. In some embodiments, the presently disclosed subject matter provides a cementitious concrete mixture comprising the binder mixture and further comprising coarse aggregate and/or fibers.

In some embodiments, the presently disclosed subject matter provides a method of repairing an existing concrete or non-concrete structure, the method comprising providing a binder mixture comprising a solids mixture comprising red mud and an alumina silicate material and an aqueous solution comprising an alkali metal hydroxide, wherein said binder mixture optionally further comprises fine aggregate; and applying said binder mixture to an existing structure in need of repair. In some embodiments, the presently disclosed subject matter provides a method of preparing a concrete structure, wherein the method comprises providing a concrete mixture comprising a solids mixture comprising red mud and an alumina silicate material, an aqueous solution comprising an alkali metal hydroxide, and coarse aggregate and/or fibers; and forming a component or a part of a component of a concrete structure.

In some embodiments, the presently disclosed subject matter provides a geopolymer composition comprising a reaction product of a reaction mixture comprising an alkaline solution and a solids mixture, wherein the solids mixture comprises a red mud that has been used in a flue-gas desulfurization process and an alumina silicate material, wherein the alumina silicate material comprises at least about 10 weight % (wt %) CaO and is selected from the group comprising Class C fly ash, lime-Class F fly ash, a blast furnace slag, and combinations thereof, and wherein the alkaline solution comprises an aqueous solution of an alkaline compound.

In some embodiments, the presently disclosed subject matter provides a method of preparing a geopolymer composition, the method comprising: (a) providing a solids mixture comprising an alumina silicate material and red mud, wherein said alumina silicate material comprises at least about 10 weight % (wt %) CaO and is selected from the group comprising Class C fly ash, lime-Class F fly ash, a blast furnace slag, and combinations thereof, and wherein said red mud is red mud that has been used in a flue-gas desulfurization process; (b) mixing the solids mixture with an alkaline solution to provide an uncured mixture, wherein the alkaline solution comprises an aqueous solution of a water-soluble alkaline compound; and (c) curing the uncured mixture for a period of time at ambient temperature to provide the geopolymer composition.

In some embodiments, the presently disclosed subject matter provides a cementitious binder mixture comprising: (i) a solids mixture comprising red mud and an alumina silicate material, wherein the red mud is a red mud that has been used in a flue-gas desulfurization process and wherein the alumina silicate material comprises at least about 10 weight % CaO; and (ii) an aqueous solution comprising an alkaline compound. In some embodiments, the binder mixture can further comprise fine aggregate and/or can be used in a method of repairing an existing concrete or non-concrete structure. In some embodiments, the binder mixture can further include coarse aggregate and/or fibers, and can be used to prepare a concrete structure or a part of a concrete structure.

Accordingly, it is an object of the presently disclosed subject matter to provide geopolymer compositions derived from Class C fly ash and red mud, as well as methods of their preparation and use.

An object of the presently disclosed subject matter having been stated hereinabove, and which is achieved in whole or in part by the presently disclosed subject matter, other objects will become evident as the description proceeds hereinbelow.

DETAILED DESCRIPTION

Figure 1A:
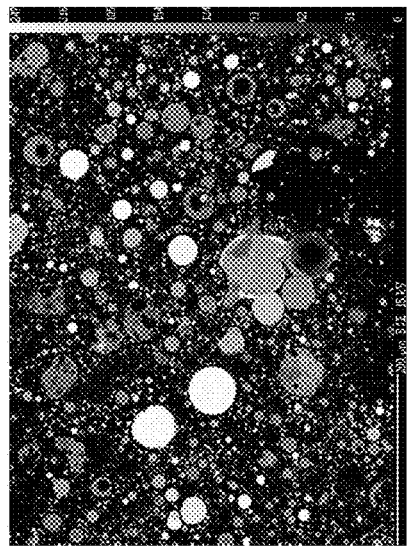
FIG. 1A is an electron microprobe (EMP) micrograph of Class C fly ash. The white scale bar in the lower left hand corner represents 200 microns (μm).

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. DEFINITIONS

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a," "an," and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising," which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Unless otherwise indicated, all numbers expressing quantities of temperature, time, weight, volume, concentration, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value is meant to encompass variations of in one example ±20% or ±10%, in another example ±5%, in another example ±1%, and in still another example ±0.1% from the specified amount, as such variations are appropriate to perform the disclosed methods.

Numerical ranges recited herein by endpoints include all numbers and fractions subsumed within that range (e.g. 1 to 5 includes, but is not limited to, 1, 1.5, 2, 2.75, 3, 3.90, 4, and 5).

The term "cement" and "cementitious" as used herein refer to compositions which set and adhere to other materials to act as a binder.

The term "concrete" refers to a material that comprises a cement and aggregate. Suitable aggregate for the geopolymer concretes described herein can be aggregate known for use as aggregate in concretes prepared using other cements, e.g., OPC. The aggregate can be coarse aggregate, fine aggregate or combinations thereof. Coarse aggregate can have an average particle size of at least about 4.75 mm (0.195 inches) and up to about 3.81 cm (i.e., 1.5 inches) or more. Fine aggregate can have an average particle size of less than about 4.75 mm or between about 0.1 mm and about 4.75 mm. Suitable coarse aggregates include inorganic rock materials of any particle shape or shapes (e.g., angular, rough-textured, elongated, rounded or smooth). Suitable rock materials include minerals, such as, but not limited to, granite, basalt, quartz, riolite, andesite, tuff, pumice, limestone, dolomite, sandstone, marble, chert, flint, greywacke, slate, and/or gneisses. Suitable materials for fine aggregate include, but are not limited to, sand, dolomite, limestone, calcium carbonate, ground clay, shale, slate, mica, and talc.

The term "pozzolanic" and variations thereof refers to siliceous or siliceous and aluminous materials that, by themselves possess little or no cementitious value, but which can, when in finely divided form, react chemically with calcium hydroxide ($Ca(OH)_2$) in the presence of water to form cementitious compounds. Pozzolanic materials can be man-made or natural. Examples of pozzolanic materials include, but are not limited to, metakaolin, fly ashes, silica fume, rice husk ash, volcanic ashes, pumice, perlite, diatomaceous earth, finely ground clay, finely ground shale, finely ground slate, and finely ground glass The term "geopolymer" as used herein refers to a covalently bonded, inorganic polymer-like network made from mixtures of water-soluble alkali metal silicates and aluminosilicate mineral powders. Geopolymer networks can comprise $SiO_4$ and $AlO_4$ tetrahedrons alternatively bound by oxygen atoms, with cations present in structural cavities to balance the negative charges. Pure geopolymer can comprise the formula $M_n^+\{-(SiO_2)_z-AlO_2-\}_n$, where M is a cation, (e.g., $Na^+$ or $K^+$), n is the degree of polymerization, and z is the Si/Al molar ratio (i.e., 1, 2, 3, or more). Geopolymers can comprise three-dimensional networks of poly(sialate) (i.e., $M_n(-Si-O-Al-O-)_n$), poly(sialate-siloxo) (i.e., $M_n(-Si-O-Al-O-Si-O-)_n$) and/or poly(sialate-disiloxo) (i.e., $M_n(-Si-O-Al-O-Si-O-Si-O-)_n$).

As used herein, the term "red mud" refers to a side product of the Bayer process of refining bauxite to produce alumina. Red mud is a mixture of solid and metallic oxides, the main component of which is iron oxide. Red mud can also include, for example silica, residual alumina and titanium oxide. The pH of untreated red mud is typically between about 10 to about 13.

Fly ash is a fine powder byproduct formed from the combustion of coal, e.g., in electric power plant utility boilers. Fly ashes include mainly glassy spherical particles, as well as residues of hematite and magnetite, char, and some crystalline phases formed during cooling. The structure, composition and properties of fly ash particles depend upon the structure and composition of the coal and the combustion process by which the fly ash is formed. ASTM C618 (2008) recognizes two major classes of fly ash: Class C and Class F. These two types of fly ash are generally derived from different kinds of coals that are a result of differences in the coal formation processes occurring over geological time periods. Class F fly ash is normally produced from burning anthracite and/or bituminous coal while Class C fly ash is normally produced from lignite or sub-bituminous coal.

Class C and Class F fly ashes can be differentiated according to their pozzolanic properties. The minimum limit of $SiO_2+Al_2O_3+Fe_2O_3$ for Class F fly ash according to ASTM C618 is 70%, while the minimum limit of $SiO_2+Al_2O_3+Fe_2O_3$ for Class C fly ash is 50%. Thus, Class F fly ashes are generally more pozzolanic than Class C fly ashes. Also, while not explicitly recognized in ASTM C618(2008), Class C fly ashes are higher in calcium oxide (lime) content.

II. GENERAL CONSIDERATIONS

Red mud, an industrial waste product from the alumina/aluminum industry, has been continuously produced since the inception of the aluminum industry in the late nineteenth century. It is estimated that the global total of red mud residue reached 2.7 billion tons in 2007, with an annual increase of 120 million tons. See Kumar et al., Construction and Building Materials, 38, pp. 865-871 (2013). The amount of red mud produced has raised significant environmental concerns, making it highly desirable to develop and implement improved means of storage and remediation, and to pursue large-volume utilization options for red mud as a toxic industrial waste product. Until now, most red mud has simply been stored in huge ponds as a waste by-product. However, due to an excessive amount of alkaline solution used for the extraction of alumina by the Bayer process, red mud is characterized by high alkalinity, leading to potential environmental problems due to soil and groundwater pollution.

One potential method for reducing red mud alkalinity is to utilize red mud for flue-gas desulfurization (FGD), a pollution control process for the removal of sulfur oxides and other acid gases (such as, for example, carbon dioxide, nitrogen oxides, etc.) from the exhaust from coal-fired power plants. See Pang et al., Advanced Materials Research, 634-638, pp. 198-203 (2013). Given that the aluminum industry consumes a large amount of electricity which is typically generated on-site, it can be beneficial to use alkaline red mud waste as an acid-absorbing agent in the desulfurization of flue gas produced from any on-site coal-burning power plants. During FGD, the high alkalinity of red mud is neutralized by the acidic flue-gas, alleviating at least some of the hazardous environmental issues associated with the red mud. Still, large-volume utilizations, such as civil engineering applications, are needed to exploit the potential benefits of flue-gas desulfurized red mud.

One possible large volume application for red mud is in the production of geopolymers. An economic evaluation reveals that the most costly factor in geopolymer production is the supply of alkaline reagent. Since red mud is highly alkaline and contains both alkalis and aluminates, it has the potential to be utilized in geopolymer production. Several researchers have attempted to use red mud to make geopolymer materials, but have met with limited success. See Dimas et al., Mineral Processing & Extractive Metallurgy Review, 30(3), pp. 211-239 (2009); Zhang et al., Transportation Research Record: Journal of the Transportation Research Board, 2167, 1-9 (2010); He, "Synthesis and Characterization of Geopolymers for Infrastructural Applications," Ph.D. Dissertation, Nottingham University, August 2012; and He et al., Construction and Building Materials, 30, pp. 80-91 (2012).

The presently disclosed subject matter provides, in one aspect, a use for red mud, either as originally produced during the extraction of alumina or after use in a FGD process or other exposure to an exhaust gas, as a material for the production of geopolymers. As described further herein below, according to the presently disclosed subject matter, it has been found that red mud-based geopolymer compositions can be cured at ambient temperature within a time frame useful for civil engineering applications, e.g., the building of roads, tunnels, bridges, dams, airports, water supply systems, sewage treatment facilities, houses, and other structures. As described in the Examples below, the setting time, compressive strength, and failure strain of red mud-based geopolymers cured at ambient temperature were tested. The composition and microstructures of the materials were characterized by X-ray diffraction (XRD), electron microprobe (EMP) and scanning electron microscopy (SEM).

More particularly, as described further hereinbelow, both dried original red mud and red mud after FGD were used to produce geopolymers. In exemplary methods, the red mud was mixed with a Class C fly ash at a constant ratio of 50:50 and with an aqueous alkaline solution comprising an alkali metal hydroxide, cured at ambient temperature, and tested for compressive strength at different ages. The geopolymer derived from original red mud had a compressive strength of 15.2 MPa when prepared using an alkaline solution at an optimal NaOH concentration, whereas the geopolymer derived from red mud after FGD achieved a higher strength of 20.3 MPa when prepared using an alkaline solution at an optimal NaOH concentration. Thus, both exemplary geopolymers showed promise to be useful materials for civil engineering applications.

Without being bound to any one theory, it is believed that, due to the active CaO present in the Class C fly ash, heterogeneous nucleation-crystallization and aluminosilicate geopolymerization can occur simultaneously. A comparison of the difference in the optimal NaOH concentrations used in the preparation of the exemplary geopolymers indicated that the high alkalinity of the original red mud can contribute to geopolymerization. However, additional hydroxide is still needed to achieve good compressive strength.

Again without being bound to any one theory, the relatively higher strength of the exemplary geopolymer derived from red mud after FGD is believed to be attributable, at least in part, to the presence of $Na_2SO_4$, a reaction product of NaOH and flue gas. As an activator, $Na_2SO_4$ can increase pH value and accelerate the dissolution of fly ash under an alkaline environment. Thus, the presently disclosed subject matter reveals a potential synergy amongst the alumina, power plant, and geopolymer industries.

In some embodiments, the presently disclosed subject matter provides a geopolymer composition comprising a reaction product of a reaction mixture comprising an alkaline solution and a solids mixture, wherein the solids mixture comprises red mud and an alumina silicate material that comprises at least about 10 weight % (wt %) CaO. In some embodiments, the alumina silicate comprises Class C fly ash, lime-Class F fly ash, a blast furnace slag, or any combination thereof.

The alkaline solution can be an aqueous solution of a water-soluble alkaline compound. In some embodiments, the alkaline solution comprises an aqueous solution comprising at least one alkali metal hydroxide. In some embodiments, the alkaline solution can also comprise another alkaline compound (i.e., in addition to the at least one alkali metal hydroxide), such as an alkaline metal earth metal hydroxide, a silicate (e.g., a sodium silicate) or another water-soluble alkaline compound. In some embodiments, e.g., when the red mud is an untreated red mud, the alkaline solution does not include a silicate or a sodium silicate. In some embodiments, the alkaline solution does not include a calcium-containing alkaline compound. Thus, in some embodiments, the presently disclosed subject matter is based on a geopolymer composition prepared by mixing a red mud and an alumina silicate material with a hydroxide solution (e.g., comprising additional hydroxide, i.e., hydroxide that is in addition to any hydroxide present in the solid red mud), optionally in combination with one or more other water-soluble alkaline compounds.

In some embodiments, the alumina silicate material of the solids mixture comprises or consists of fly ash. The fly ash can comprise between about 10 wt % and about 30 wt % CaO. The other chemical constituents of the fly ash can include various oxides, such as $SiO_2$, $Al_2O_3$, $Fe_2O_3$, $Na_2O$, MgO, $K_2O$, and $SO_3$. In some embodiments, the fly ash comprises between about 15 wt % and about 21 wt % CaO (e.g., about 15, 16, 17, 18, 19, 20, or 21 wt % CaO).

The red mud can be a dried red mud produced as a side product of the Bayer process for extracting alumina. In some embodiments, the red mud can be alkaline, e.g., having a pH of between about 10 and about 13 (e.g., about 10, 10.5, 11, 11.5, 12, 12.5, or about 13). In some embodiments, the red mud has a pH of about 12.5. However, in some embodiments, the red mud is a red mud that has been used in a flue gas desulfurization (FGD) process or otherwise exposed to a combustion product gas comprising sulfur dioxide ($SO_2$). The flue gas desulfurization process can be any process known in the art for removing sulfur dioxide ($SO_2$) from boiler or furnace exhaust or from another $SO_2$-emitting process. Thus, in some embodiments, the red mud is red mud that has been used in a FGD process of exhaust from a fossil fuel (e.g., coal)-burning power plant or of exhaust gas from a refinery, a petrochemical plant, a chemical plant or an incinerator. FGD and/or exposure to $SO_2$-containing exhaust gas can lower the pH of the red mud and/or increase the $SO_3$ (and/or $Na_2SO_4$) content of the red mud. Thus, in some embodiments, the red mud has a pH that is about 6 or less. In some embodiments, the red mud has a pH of between about 3 and about 6. In some embodiments, the red mud has a pH of about 4.5. In some embodiments, the red mud comprises about 1 wt % $SO_3$ or more. In some embodiments, the red mud comprises between about 2 wt % and about 3 wt % $SO_3$.

The solids for the reaction mixture can be mixed in any desired weight ratio. In some embodiments, the red mud and the alumina silicate material (e.g., Class C fly ash) can be mixed together in a weight ratio of between about 40:60 red mud:alumina silicate material and about 60:40 red mud:alumina silicate material. In some embodiments, the red mud and the alumina silicate material can be mixed together with a weight ratio between about 30:70 (i.e., 30 wt % red mud and 70 wt % alumina silicate material) and about 70:30 (i.e., about 70 wt % red mud and 30 wt % alumina silicate material). In some embodiments, the weight ratio of red mud to alumina silicate material can be about 35:65, about 40:60, about 45:55, about 50:50, about 55:45, about 60:40, or about 65:35. In some embodiments, the weight ratio of red mud to alumina silicate material can be about 50:50.

In some embodiments, the alkaline solution comprises water and at least one alkali metal hydroxide (e.g., sodium hydroxide (NaOH), potassium hydroxide (KOH), lithium hydroxide (LiOH), etc). The alkaline solution of the presently disclosed subject matter generally has a molarity of less than the at least about 10 moles per liter (mol/L or M) alkali metal hydroxide usually employed in alkaline solutions for preparing geopolymer cements and concretes. In some embodiments, the alkaline solution has a molarity of between about 1 mol/L and about 8 mol/L alkali metal hydroxide. In some embodiments, the aqueous solution comprises between 1.5 mol/L and about 6.5 mol/L of the alkali metal hydroxide (i.e., about 1.5, 2.0, 2.5, 3.0, 3.5, 4.0, 4.5, 5.0, 5.5, 6.0, or 6.5 M alkali metal hydroxide). In some embodiments, the aqueous solution comprises between about 2.0 mol/L and about 4.0 mol/L or between about 2.5 mol/L and about 3.5 mol/L of the alkali metal hydroxide. In some embodiments, the alkali metal hydroxide is sodium hydroxide.

In some embodiments, the presently disclosed subject matter is based on a geopolymer composition prepared by mixing a red mud that has been used in a flue-gas desulfurization process and an alumina silicate material with an aqueous alkaline solution comprising any water soluble alkaline compound or combination thereof.

The alkaline solution and solids mixture can be mixed together in any desirable solution to solids mixture weight ratio. In general, lower solution to solid ratios can result in higher strength cured geopolymer compositions and less volume change during curing. Further, since the alkaline agent tends to be the more expensive starting material for the geopolymer composition, high solution to solid ratios can be more expensive. However, lower solution to solid ratios can result in non-uniformly mixed uncured compositions and poor workability. In some embodiments, the weight ratio of aqueous solution to solid mixture in the uncured composition is between about 0.3 and about 0.6 (e.g., about 0.3, about 0.35, about 0.40, about 0.45, about 0.50, about 0.55, or about 0.60). In some embodiments, the weight ration is between about 0.4 and about 0.6. In some embodiments, the weight ratio of aqueous solution to solid is about 0.5.

In some embodiments, the geopolymer composition comprises a reaction product prepared from a reaction mixture comprising a 3.5 M solution of NaOH and a solids mixture comprising a red mud that has been used in a flue-gas desulfurization process and a Class C fly ash, wherein said solids mixture comprises a red mud:fly ash weight ratio of about 50:50 and the reaction mixture has a solution:solids mixture weight ratio of about 0.5. In some embodiments, the geopolymer composition comprises a reaction product prepared from a reaction mixture comprising a 2.5 M solution of NaOH and a solids mixture comprising untreated red mud and a Class C fly ash, wherein the solids mixture further comprises a red mud:fly ash weight ratio of about 50:50 and wherein the reaction mixture has a solution:solids weight ratio of about 0.5.

In some embodiments, the geopolymer composition can further comprise aggregate (e.g., fine and/or coarse aggregate) or another filler, (e.g., a carbon fiber or another reinforcing fiber). In some embodiments, the composition can further comprise an additive (such as a coloring agent, a corrosion control agent, a foaming agent, or a wetting agent) known in the art for use in the concretes or cements. In some embodiments, the solids mixture can further include another pozzolanic material. In some embodiments, the solids mixture can include up to about 25% of a material other than the alumina silicate and the red mud, such as another pozzolanic material. However, the reaction mixture does not require and is typically free of an additional calcium compound, e.g., calcium hydroxide, calcium sulfate, and/or calcium aluminate.

The reaction product can be cured at any suitable temperature. Generally, the reaction product of the presently disclosed subject matter can be cured at a temperature below that typically required for fly ash-based geopolymers. In some embodiments, the reaction product is cured at a temperature that is less than about 40° C. In some embodiments, the reaction product is cured at ambient temperature (e.g., between about 20° C. and about 25° C.). In some embodiments, the reaction product has a compressive strength of at least about 10 megapascals (MPa) (e.g., about 10, 11, 12, 13, 14, 15, 16, 17, 18, 19, or about 20 MPa). In some embodiments, the reaction product has a compressive strength of at least about 15 megapascals (MPa) or of at least about 20 MPa.

The geopolymer composition can be provided in any suitable form. In some embodiments, the geopolymer composition can be provided in a form suitable for use as a construction material or as a construction repair material. For example, the composition can be provided in the form of a brick, board, shingle, block, or stone (e.g., a paving stone).

In some embodiments, the presently disclosed subject matter provides a method of preparing a geopolymer composition, wherein the method comprises: (a) providing a solids mixture comprising red mud and an alumina silicate material selected from Class C fly ash, lime-Class F fly ash, a blast furnace slag, or a combination thereof, wherein the alumina silicate material comprises at least about 10 weight % (wt %) CaO; (b) mixing the solids mixture with an alkaline solution to provide an uncured mixture; and (c) curing the uncured mixture for a period of time at ambient temperature to provide the geopolymer composition. In some embodiments, the alkaline solution is an aqueous solution of a water soluble alkaline compound or compounds. In some embodiments, the alkaline solution comprises at least one alkali metal hydroxide. In some embodiments, the alkaline compound is other than a sodium silicate.

The alumina silicate material, red mud, an alkaline solutions can be those as described hereinabove. For example, the red mud can be a dried red mud obtained directly as a side product produced during the production of alumina and/or aluminum (i.e., an "untreated red mud") or a red mud that has been used in a flue gas desulfurization process or otherwise exposed to a $SO_2$-containing gas. In some embodiments, the red mud is a red mud that was used in a flue-gas desulfurization process prior to mixing with the fly ash. In some embodiments, the red mud has a pH of about 4.5 and/or comprises between about 2 wt % and about 3 wt % $SO_3$. In some embodiments, the alumina silicate material comprises a Class C fly ash comprising between about 15 wt % and about 21 wt % CaO.

The solids mixture can comprise any suitable weight ratio between the red mud and the alumina silicate material (e.g., the Class C fly ash). In some embodiments, the solids mixture comprises between about 40:60 red mud:alumina silicate material and about 60:40 red mud:alumina silicate material. In some embodiments, the solids mixture comprises a weight ratio of about 50:50 red mud:alumina silicate material.

In some embodiments, the alkaline solution can comprise water and at least one alkali metal hydroxide, e.g., sodium hydroxide, potassium hydroxide, lithium hydroxide, etc. In some embodiments, the alkali metal hydroxide is sodium hydroxide. In some embodiments, the alkaline solution comprises more than about 1 mol/L of the alkali metal hydroxide (i.e., has a molarity of less than about 1 M) and less than about 8 mol/L. In some embodiments, the solution comprises between about 1.5 mol/L of the alkali metal hydroxide and about 6.5 mol/L of the alkali metal hydroxide. In some embodiments, the solution comprises between about 2.0 mol/L and about 4.0 mol/L. In some embodiments, the aqueous solution comprises between about 2.5 mol/L and about 3.5 mol/L of the alkali metal hydroxide.

The solution and the solids mixture can be mixed together in any suitable weight or volume ratio. In some embodiments, the uncured mixture has an alkaline solution to solids mixture weight ratio of between about 0.4 and 0.6 (e.g., about 0.5).

The uncured mixture can be transferred (e.g., poured into) into a suitable container (i.e., a container that does not adhere to the geopolymer and which has a desired shape) to form a cured article intended for transfer to and an end use at another location. For example, the container can be a plastic container (e.g., a vinyl container) or comprise a plastic coating layer (e.g., a vinyl coating layer). In some embodiments, the uncured mixture be transferred to or mixed at the intended site of use, e.g. at a construction site. Thus, in some embodiments, the uncured mixture can be poured into a sub-surface ground cavity or onto one or more leveled ground surfaces at a construction site. In some embodiments, the uncured mixture is poured onto or is otherwise used to coat a surface, e.g., a roadway, or a metal, wood, stone, or non-geopolymer concrete structure. The presently disclosed reaction/uncured mixtures can set in about 3 hours. However, curing is usually performed for a longer time period. In some embodiments, the curing is performed at ambient temperature for a period of time of at least about 8 hours or more. In some embodiments, the curing is performed for about 20, 22, 24, 26, 28, or more hours. In some embodiments, the curing is performed for one or more days or weeks, e.g., about 1, 2, 3, 4, 5, 6, or 7 days or more or about 1, 2, 3, 4, or more weeks.

In some embodiments, the presently disclosed subject matter provides a cementitious binder mixture, e.g., for construction and/or construction repair uses, wherein the binder mixture comprises: (i) a solids mixture comprising red mud and an alumina silicate material comprising at least 10 weight % CaO, such as a Class C fly ash, a lime-Class F fly ash, a blast furnace slag, or a combination thereof; and (ii) an aqueous solution comprising an alkaline compound (e.g., at least one alkali metal hydroxide). In some embodiments, the red mud is a red mud that has been used in a FGD process or otherwise exposed to an $SO_2$-containing gas. In some embodiments, fine aggregate can be mixed into the binder mixture to provide a mortar mixture. In some embodiments, coarse aggregate and/or reinforcing fibers (e.g., carbon fibers) can be mixed into the binder mixture to provide a concrete mixture. Thus, in some embodiments, the presently disclosed subject matter further provides a cementitious mortar mixture or a cementitious concrete mixture comprising red mud, an alumina silicate material (such as a Class C fly ash), and an alkaline solution (e.g., comprising at least one alkali metal hydroxide). The mixtures can be used, for instance, in the construction and/or repair of roadways, airplane runways, walkways, floors, walls, roofs, bridges, foundations (e.g., footings and pilings), viaducts, dams, spillways, levees, tunnels, reservoirs, bunkers, embankments, and the like. Therefore, in some embodiments, the presently disclosed subject matter provides a method of repairing a concrete or non-concrete (e.g., stone, brick, wooden, etc.) structure, wherein the method comprises providing a mortar or binder mixture comprising red mud (e.g., untreated or FGD-treated red mud), an alumina silicate material (such as a Class C fly ash), and an alkaline solution, optionally further comprising fine aggregate, and applying said mixture to an existing structure in need of repair. In some embodiments, the presently disclosed subject matter provides a method of preparing a concrete structure wherein the method comprises providing a concrete comprising red mud, an alumina silicate material (such as a Class C fly ash), an alkaline solution and coarse aggregate and forming a component (e.g., a road or walkway surface, a wall, floor, roof, support, foundation, etc.) or a part of a component of said structure.

III. EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Materials and Methods

Dried red mud, before and after FGD (referred to below as RM1 and RM2, respectively) from Xinfa Group, Shandong, China, was used as a raw material for geopolymer synthesis. Class C fly ash (FC) and Class F fly ash (FF) were also used as another raw material (Charah, Inc., Louisville, Ky., United States of America). Sodium hydroxide (NaOH) (Sigma-Aldrich Co.; St. Louis, Mo., United States of America) and deionized water were used to make an alkaline solution having different concentrations of hydroxide. Both types of red mud were pulverized and passed through a No. 50 sieve to minimize the influence of compositional variation.

The raw materials, red mud (RM1 or RM2) and fly ash (FC or FF), were mixed at a predetermined weight ratio of 50:50 for 10 minutes. Then the alkaline solution was added to the powder mixture and stirred for another 10 minutes. In general, a lower solution/solid ratio results in a higher strength and less volume change for the formed geopolymer. It is also beneficial on the economic aspect because the alkaline solution is the most expensive raw material. However, a very low solution/solid ratio can cause issues in mixing uniformity and workability. Different solution/solid ratios were tried, and a fixed solution/solid ratio of 0.5 was selected for use in the preparation of the geopolymer compositions described below.

The geopolymer reaction mixture was poured into plastic molds with an inner diameter of 2.5 cm and a height of 5 cm, followed by curing at an ambient temperature of 20° C. for 24 h. After that, the specimens were demolded and continued to cure in the same environment. The geopolymer specimens were tested for unconfined compressive strength at 3, 7, 14, 21, and 28 days at a constant strain loading rate of 0.5%/min using a Material Testing System (MTS).

X-ray diffraction (XRD), scanning electron microscope (SEM) and electron microprobe (EMP) were utilized to test the chemical composition and microstructure of the geopolymers. A CAMECA™ SX-100 electron microprobe (EMP) (CAMECA SAS, Gennevilliers, France), equipped with 4 wavelength dispersive spectrometers (WDS), was used for microstructure imaging and composition analysis for both raw materials and geopolymers. Since a polished flat surface is necessary for EPM test samples, epoxy resin was added to the samples of red mud and fly ash to make them capable of being polished. A GeminiSEM scanning electron microscope (Carl Zeiss, AG, Oberkochen, Germany) was used to obtain more detailed microstructure images. XRD patterns were recorded to acquire the elemental compositions of the raw material and geopolymers.

Example 2

Effect of Source Materials

Using EMP, each sample was tested in both spot mode and line mode, and the chemical composition of the samples was analyzed. Table 1, below, presents the chemical compositions of the raw materials, including red mud before (RM1) and after (RM2) FGD, as well as Class C (FC) and Class F (FF) fly ash. FIGS. 1A-1D show the micrographs of the raw materials from EMP. In FIGS. 1A-1D, the grey scale of the different phases is a measure of average atomic number. White areas are generally Fe and S phases, darker areas are silicates, and near black areas are epoxy or carbon.

TABLE 1

Chemical Constituents of raw materials, wt %

| | $SiO_2$ | $Al_2O_3$ | $Fe_2O_3$ | CaO | $Na_2O$ | MgO | $K_2O$ | $SO_3$ |
|---|---|---|---|---|---|---|---|---|
| FC | 44.41 | 18.79 | 10.01 | 18.59 | 0.89 | 3.03 | 1.44 | 1.81 |
| FF | 43.16 | 22.80 | 23.60 | 3.29 | 0.75 | 0.73 | 1.62 | 1.20 |
| RM1 | 25.58 | 26.40 | 23.26 | 1.33 | 14.98 | 0.15 | 0.21 | 0.80 |
| RM2 | 26.15 | 27.23 | 23.98 | 1.13 | 11.45 | 0.17 | 0.23 | 2.73 |

Figure 1B:
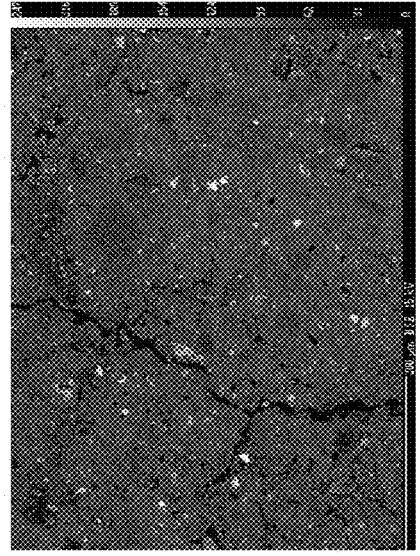
FIG. 1B is an electron microprobe (EMP) micrograph of Class F fly ash. The white scale bar in the lower left hand corner represents 200 microns (μm).
Figure 1C:
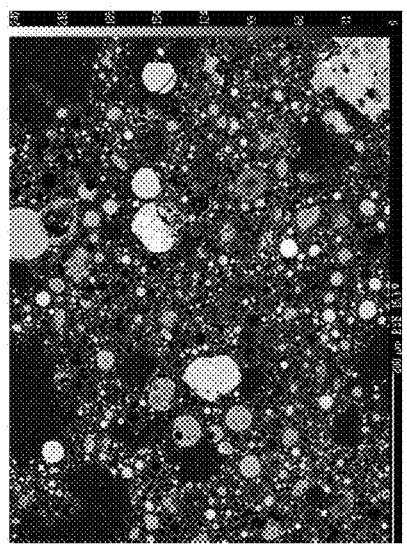
FIG. 1C is an electron microprobe (EMP) micrograph of dried, untreated red mud. The white scale bar in the lower left hand corner represents 200 microns (μm).
Figure 1D:
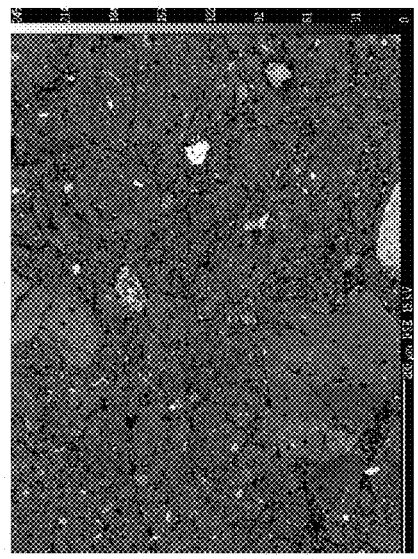
FIG. 1D is an electron microprobe (EMP) micrograph of dried red mud after used in a flue gas desulfurization process. The white scale bar in the lower left hand corner represents 200 microns (μm).

FIGS. 1A and 1B show that both Class C and Class F fly ash are mostly small solid spheres, hollow cenospheres and some plerospheres (i.e., spheres containing smaller spheres). Particle size distribution is similar between the two types of fly ash. Although no significant differences could be identified between the class C and class F fly ash from the micrographs, Table 1 shows that the Class C fly ash had a higher CaO content than the Class F fly ash, whereas the Class F fly ash contained more $Fe_2O_3$ than the Class C fly ash.

The microstructures of the red muds were nearly identical. See FIGS. 1C and 1D. The red muds also had very similar chemical compositions, which were rich in silica and alumina, except that the red mud after FGD (RM2) had a relatively higher $SO_3$ content, which is believed to be attributable to the flue-gas. Another difference between the two types of red mud is pH value. While RM1 was highly alkaline with a pH value of 12.5, RM2 had a pH value of 4.5 due to the acid-alkali neutralization reaction, indicating that no alkaline reagent would be available from the RM2 for geopolymer synthesis.

Example 3

Geopolymer Mechanical Properties

The mineralogical composition of the fly ash can have a direct effect on the mechanical properties of the hardened geopolymer prepared from the fly ash. Low-calcium (Class F) fly ash has been studied and used more often than high calcium (Class C) fly ash as a raw material for geopolymers based on the theory that a high amount of calcium in fly ash can determine the geopolymer reaction pathway and alter the microstructure of the final products. However, it has previously been found that Class F fly ash-based geopolymers cured at ambient temperature show an extremely slow reaction rate, or even do not set at all. In the present study, both Class C and Class F fly ash were mixed with red mud at a constant ratio to synthesize geopolymers at ambient temperature. Samples of Class C fly ash-based geopolymer were strong enough to be successfully demolded after 24 h. In contrast, the Class F fly ash mixture was still weak after 24 h and could not be demolded, and the compressive strength test could not be performed on Class F fly ash-based geopolymer due to the extremely slow strength development. Only after the temperature was raised to 65° C. could the strength of the Class F fly ash-based geopolymer be successfully tested.

Figure 2:
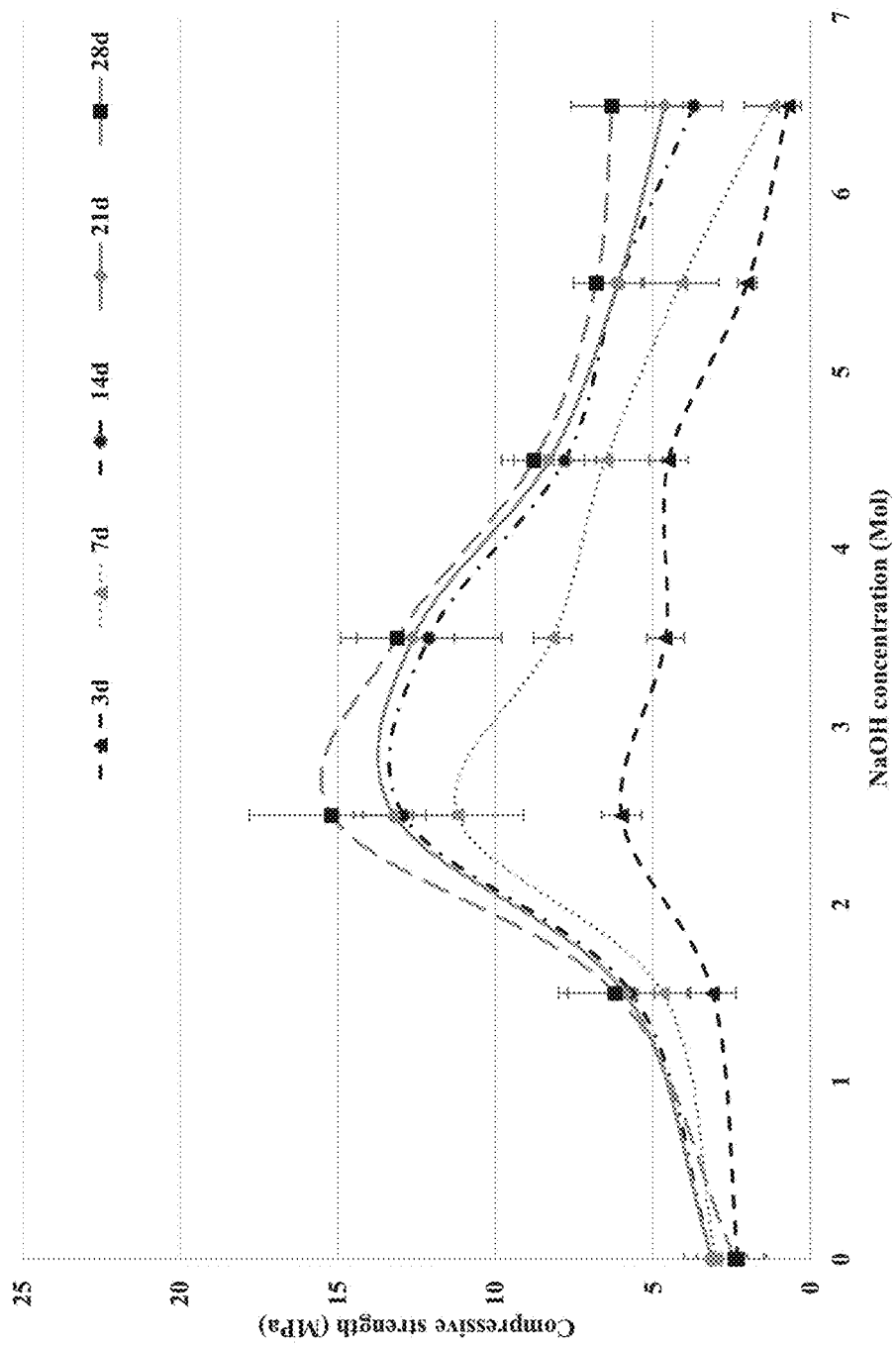
FIG. 2 is a graph of the unconfined compressive strength of geopolymer compositions prepared from untreated red mud, Class C fly ash, and alkaline solutions comprising different sodium hydroxide (NaOH) concentrations (i.e., 0, 1.5, 2.5, 3.5, 4.5, 5.5, or 6.5 molar (M)). The data shown corresponds to compressive strength (in megapascals (MPa)) measured after three days (black triangles), seven days (grey triangles), 14 days (black circles), 21 days (grey diamonds) and 28 days (black squares).
Figure 3:
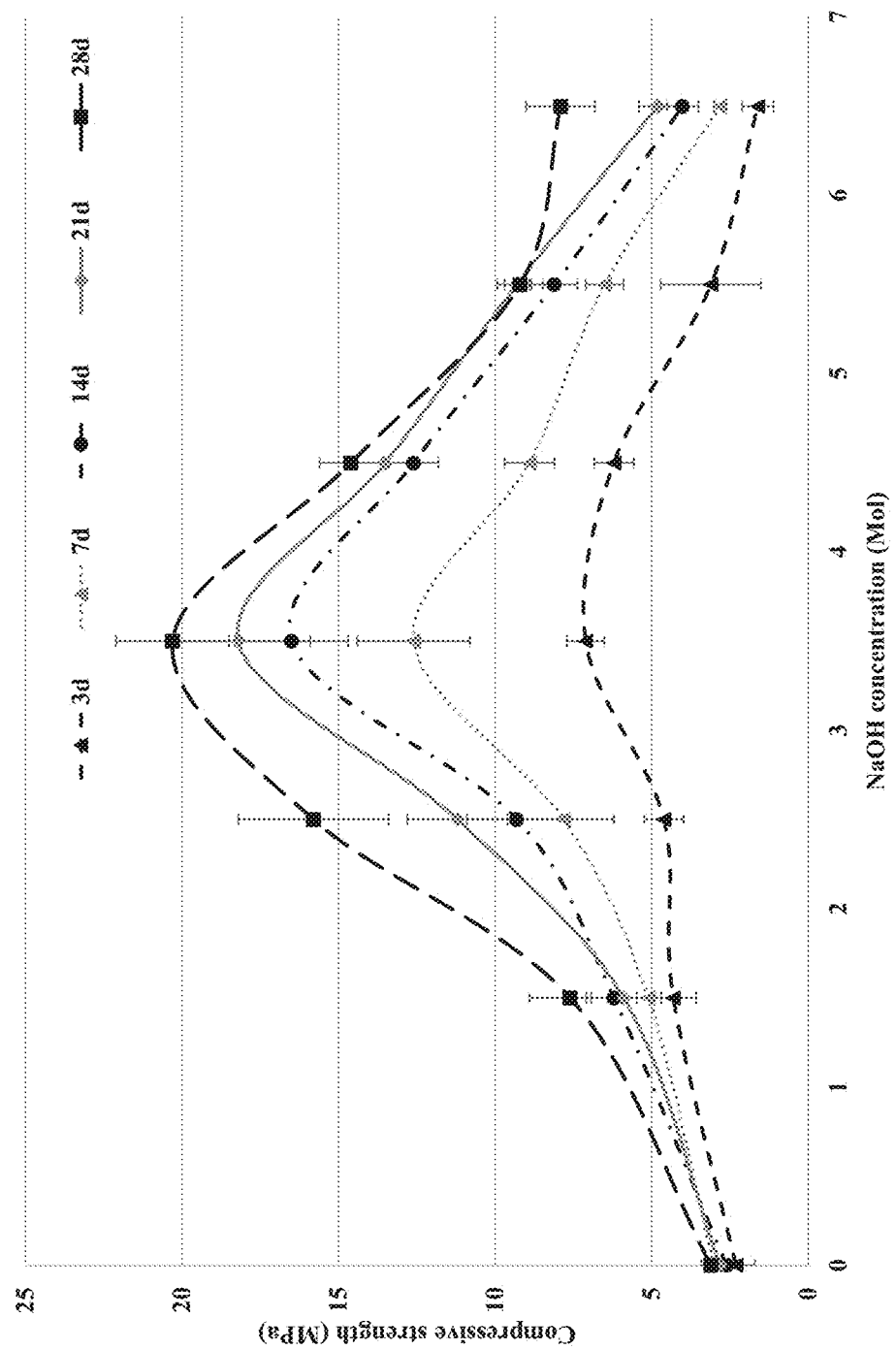
FIG. 3 is a graph of the unconfined compressive strength of geopolymer compositions prepared from flue gas desulfurization-treated red mud, Class C fly ash, and alkaline solutions comprising different sodium hydroxide (NaOH) concentrations (i.e., 0, 1.5, 2.5, 3.5, 4.5, 5.5, or 6.5 molar (M)). The data shown corresponds to compressive strength (in megapascals (MPa)) measured after three days (black triangles), seven days (grey triangles), 14 days (black circles), 21 days (grey diamonds) and 28 days (black squares).

For this reason, the presently disclosed subject matter focuses on Class C fly ash-based geopolymers (RM1/FC and RM2/FC). Class C fly ash-based geopolymers were prepared using alkaline solutions of different hydroxide concentration (i.e., 0, 1.5, 2.5, 3.5, 4.5, 5.5, or 6.5 M NaOH). FIGS. 2 and 3 show the unconfined compressive strength of RM1-FC and RM2-FC geopolymers (Si/Al ratio=1.5), respectively.

Figure 4A:
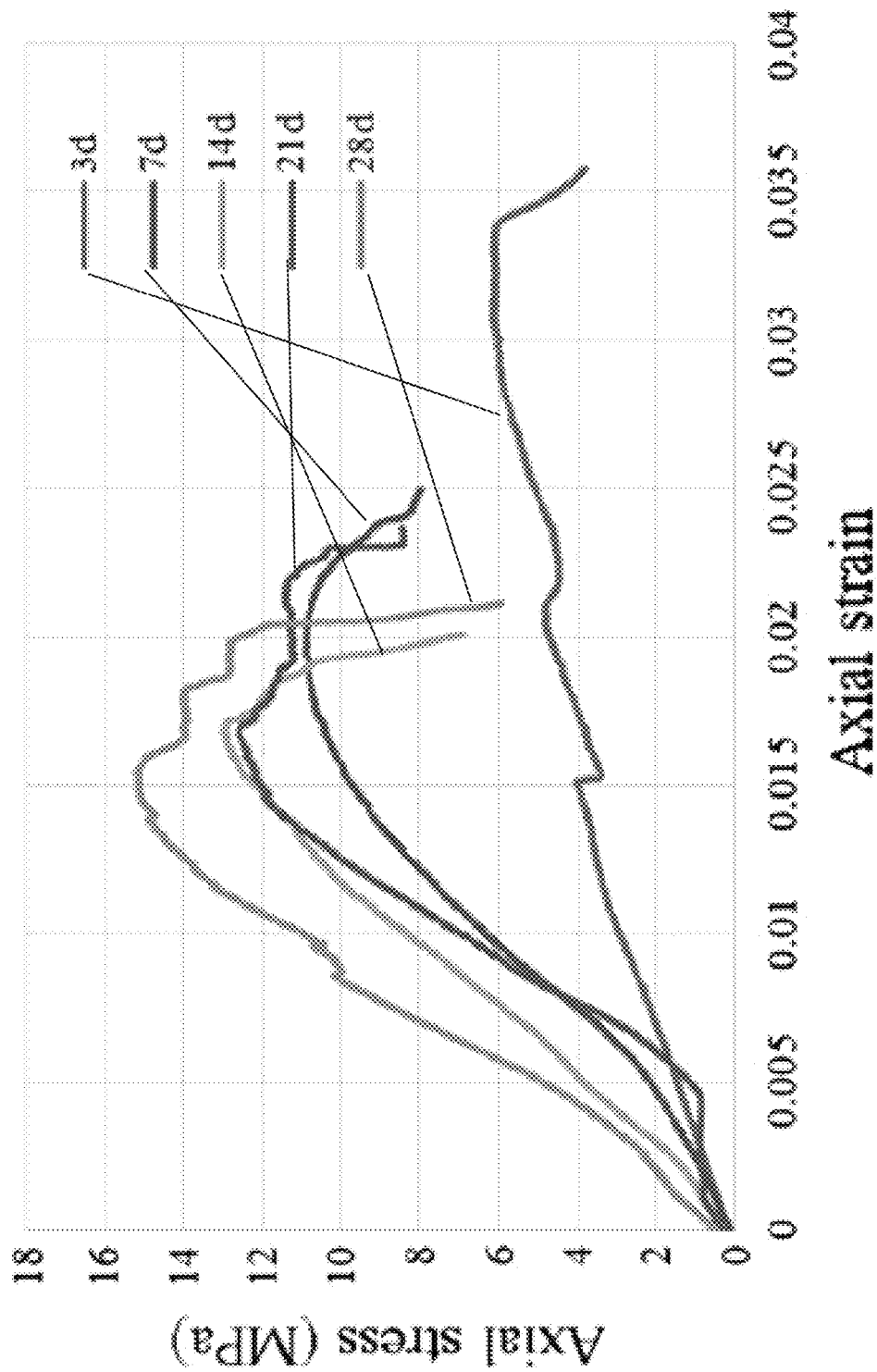
FIG. 4A is a graph of the stress-strain curves of the geopolymers described for FIG. 2 prepared using 2.5 molar (M) sodium hydroxide solution.
Figure 4B:
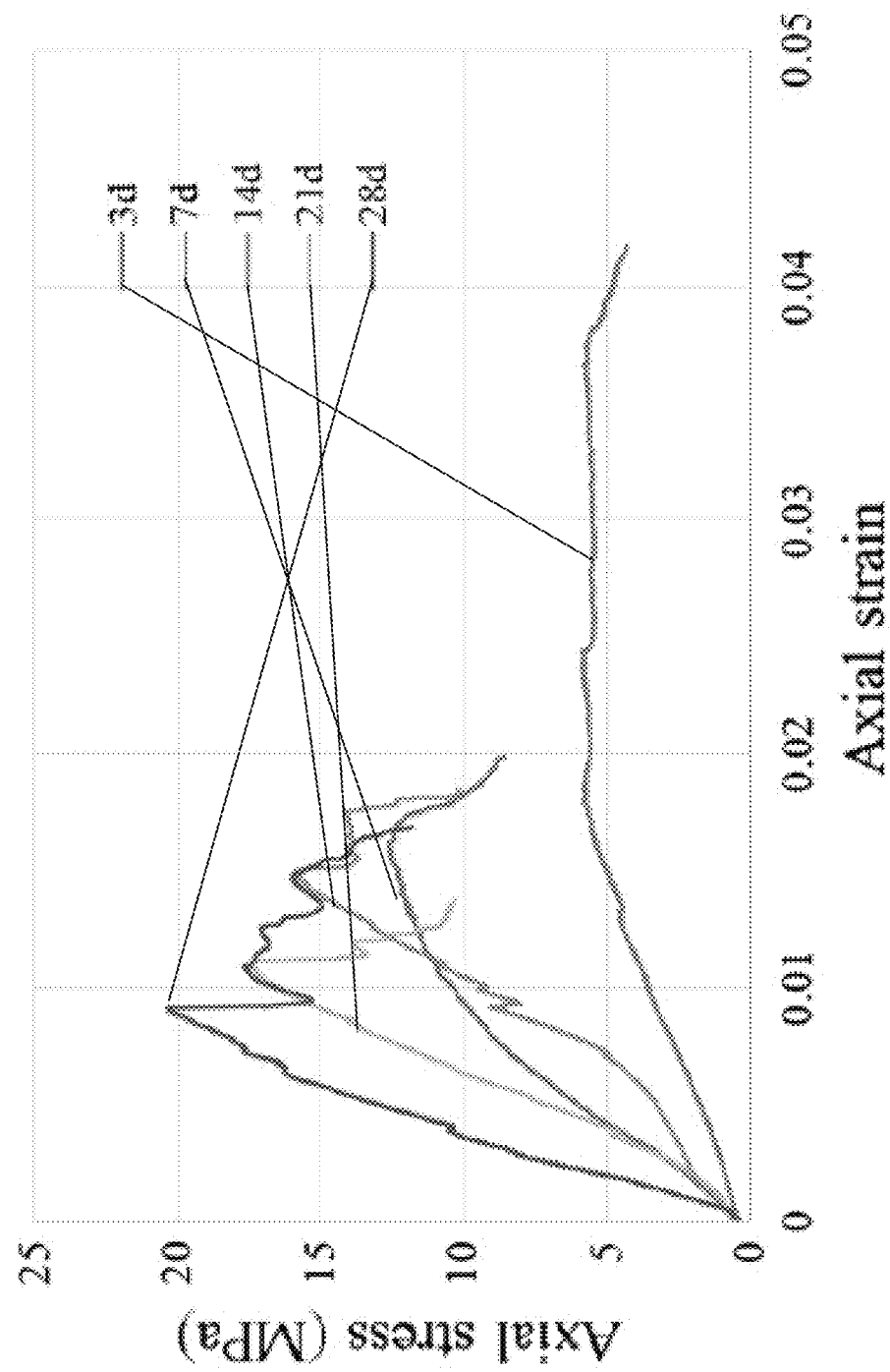
FIG. 4B is a graph of the stress-strain curves of the geopolymers described for FIG. 3 prepared using 3.5 molar (M) sodium hydroxide solution.
Figure 5A:
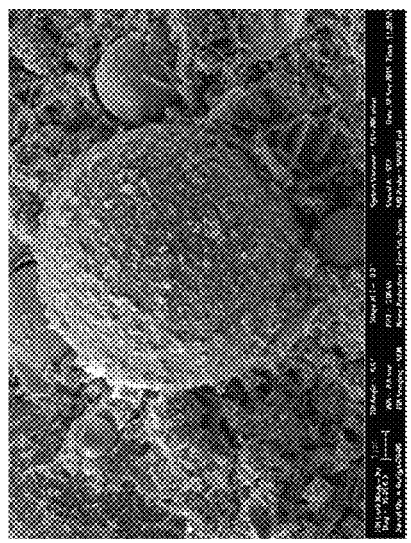
FIG. 5A is a scanning electron microscopy (SEM) micrograph of a geopolymer composition prepared from a mixture of red mud, Class C fly ash and an alkaline solution comprising 2.5 molar sodium hydroxide.
Figure 5B:
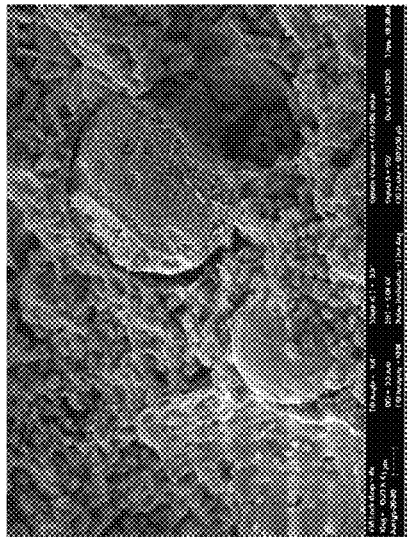
FIG. 5B is a scanning electron microscopy (SEM) micrograph of a geopolymer composition prepared from a mixture of flue gas desulfurization-treated red mud, Class C fly ash and an alkaline solution comprising 3.5 molar sodium hydroxide.

As shown in FIGS. 2 and 3, NaOH concentration had an effect on compressive strength for geopolymers made with red mud before and after FGD. For the geopolymer samples prepared from mixtures to which no alkaline solution was added, the compressive strength developed extremely slowly after the first three days and reached only around 3 MPa at 28 days. In contrast, a significant increase in strength could be observed for geopolymer samples prepared from mixtures prepared with added alkaline solution of different NaOH concentrations. FIGS. 2 and 3 show that there is an optimal NaOH concentration that can be used to achieve the maximum compressive strength for the geopolymers. With the increase in NaOH molarity from zero to the optimal content, the compressive strength of geopolymer also increased. When the NaOH molarity exceeded the optimal content, further increase in NaOH molarity reduced the compressive strength of the geopolymer. From FIGS. 2 and 3, it can be observed that the optimal NaOH concentration was around 2.5 M for RM1-FC geopolymer and around 3.5 M for RM2-FC geopolymer. At their optimal NaOH concentrations, the RM2-FC geopolymer had a higher strength of up to 20.3 MPa at 28 days, compared to an average strength of 15.2 MPa for RM1-FC geopolymer under the same curing duration. The RM1-FC and RM2-FC geopolymers showed a similar stress-strain relationship. FIG. 4A shows the stress-strain curves of one RM1-FC sample prepared with a 2.5 M NaOH solution for each curing duration timepoint. It can be seen that with the increase in curing duration, the strain at failure decreased from around 0.035 at three days to 0.015 at 28 days. FIG. 4B shows the stress-strain curves of one RM2-FC sample prepared with 3.5 M NaOH solution for each curing duration timepoint.

Example 4

Geopolymer Microstructure

Figure 6A:
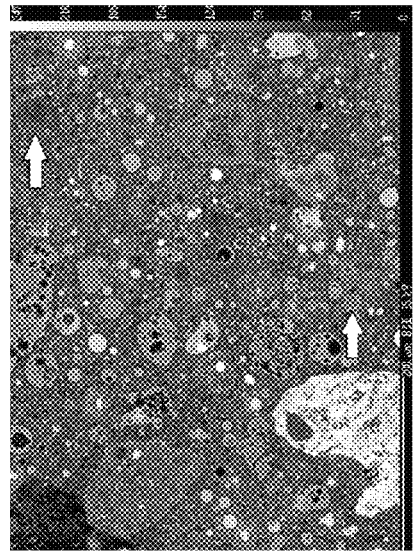
FIG. 6A is an electron microprobe (EMP) micrograph of a geopolymer composition prepared from a mixture of red mud, Class C fly ash and an alkaline solution comprising 2.5 molar sodium hydroxide.
Figure 6B:
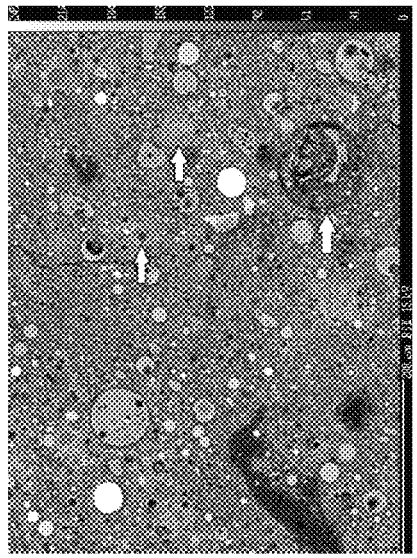
FIG. 6B is an electron microprobe (EMP) micrograph of a geopolymer composition prepared from a mixture of flue gas desulfurization-treated red mud, Class C fly ash and an alkaline solution comprising 3.5 molar sodium hydroxide.

FIGS. 5A, 5B, 6A, and 6B compare the microstructures of RM1-FC and RM2-FC specimens using SEM (FIGS. 5A and 5B) and EMP (FIGS. 6A and 6B). When the red mud and fly ash mixtures are mixed with NaOH solution, the active Al and Si from the raw materials dissolve and form a gel. According to the SEM and EPM micrographs, the majority of Class C fly ash particles were found to be micro-spheres with sizes from 1 to 30 µm. Some spheres were broken under alkaline dissolution. The higher weight molecules in the gel can condense inside and outside the sphere. Although Al and Si account for more than half of the composition of red mud, a considerable amount of the Al and Si content was inactive, and thus served as an inert filler in the geopolymer binder. From FIG. 5A it can be seen that the fly ash spheres were bonded with newly formed needle-shaped particles in the RM1-FC geopolymer. The geopolymerization is demonstrated well in FIG. 5B for the RM2-FC geopolymer: part of the shell of the fly ash sphere in the middle was dissolved by the alkaline solution, revealing smaller particles inside. Both the inside particles and the remaining outer shell were under alkaline attack forming a sodium aluminosilicate gel and binding the active particle and inactive filler integrally as a cementitious matrix.

FIGS. 6A and 6B show a more holistic approach for analyzing the geopolymer using EMP. From these figures, it can be seen that the fly ash particles were evenly distributed in the red mud filler. The white arrows point to fly ash particles that did not have a distinct boundary with their surroundings, indicating the dissolution of some fly ash particles under the alkaline environment. However, it is also observed that a considerable number of fly ash particles remained unreactive. It is believed that this variability can be due to the differences in the chemical properties of fly ash and the availability of alkalis. The chemical constituents of various particles were examined using EMP, and the test results reveal that the chemical constituents of fly ash particles varied. For example, the pure white particles in FIGS. 6A and 6B were mainly composed of $Fe_2O_3$, which appear to show no appreciable reaction according to their clear boundaries. In FIG. 6B, the big particle with many irregular small particles inside indicated by the white arrow was mainly composed of $SiO_2$ and CaO. Its boundary was hard to identify.

Figure 7:
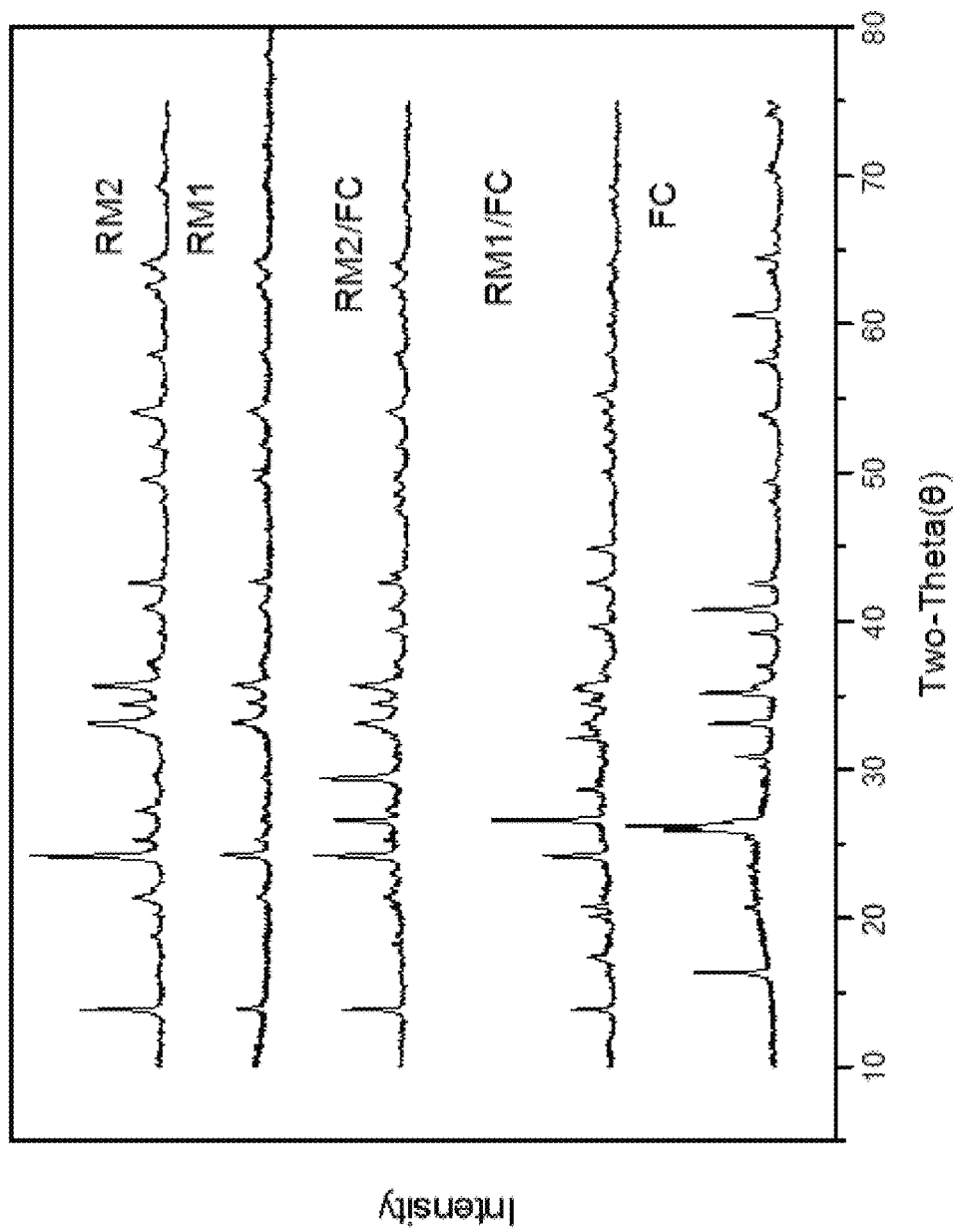
FIG. 7 is a graph of x-ray diffraction (XRD) patterns for, from top to bottom, flue gas desulfurization-treated red mud (RM2), untreated red mud (RM1), a geopolymer prepared from a mixture of RM2 and Class C fly ash (RM2/FC), a geopolymer prepared from a mixture of RM1 and Class C fly ash (RM1/FC), and Class C fly ash (FC).

FIG. 7 shows the XRD patterns of the raw materials and the corresponding geopolymers. Both types of red mud show similar patterns with no observable broad humps, indicating that no large quantity of amorphous phase exists in red mud. The RM1-FC and RM2-FC geopolymers also show similar patterns with the presence of sharp peaks from red mud and fly ash. This confirms that the crystalline phases acted as inactive fillers in the geopolymer network. A week, broad bump is observable between 20° and 36° (2θ), which is a characteristic peak of geopolymers. See Duxson et al., Journal of Materials Science, 42(9), pp. 2917-2933 (2007). The only difference between the two geopolymers is that a few weak peaks were detected between 24° and 35° (2θ) for RM2-FC geopolymer, indicating the presence of $CaSO_4$.

Example 5

Discussion of Examples 1-4

Three raw materials, red mud (either before or after FGD), Class C fly ash, and an alkaline aqueous solution, were used to synthesize red mud-based geopolymer at ambient temperature. According to the geopolymerization theory, a pure geopolymer network is built up mainly by Si, Al and O, with alkali $Na^+$ to balance the charge of Al. However, when compared to failed attempts to produce Class F fly ash-based geopolymer at ambient temperature, it appears that the active Ca in Class C fly ash has a positive effect on the strength development of geopolymer cured at ambient temperature. Therefore, the final products of the presently disclosed subject matter cannot be acknowledged as a pure geopolymer, but rather a composite material with unreactive fillers, calcium silicate hydrate (CSH) and newly-formed geopolymer structure. Nevertheless, products formed using either red mud before FGD or after FGD both show a relatively high compressive strength when cured at ambient temperature, which is suitable for civil engineering applications at normal temperature.

The Class C fly ash used to prepare the present exemplary geopolymer compositions had a CaO content of close to 20%, which, without being bound to any one theory, is believed to explain the distinct effects between Class C and Class F fly ash on the strength of geopolymer. The exact mechanism of calcium on the hardening of geopolymer is not fully understood. However, and again without being bound to any one theory, one explanation is that a high amount of calcium can form hydrated products, such as calcium silicate hydrate (CSH) and calcium silicate aluminate hydrate, contributing to geopolymer strength development along with the geopolymer network. As illustrated in FIG. 6B, the big particle composed of $SiO_2$ (54%), CaO (25%) and $Al_2O_3$ (8%) appears to show a relatively higher reaction rate compared to other particles, suggesting that two hardening mechanisms, heterogeneous nucleation-crystallization and the aluminosilicate geopolymerization, occur simultaneously. Previous studies have suggested that a CaO content higher than 20% results in a very rapid setting (less than 3 min) for geopolymer derived only from fly ash See Diaz et al., Fuel, 89(5), 992-996 (2010). However, according to the presently disclosed subject matter, the setting time was about 3 hours for both types of geopolymer (i.e., RM1-CF and RM2-CF) due to the combination of red mud and fly ash as raw material, despite that the fly ash CaO content being close to 20%.

Previous reports have explored the potential reuse of red mud to make geopolymer. For example, a red mud-based geopolymer derived from untreated red mud, Class C fly ash and added 1.5 M sodium trisilicate solution, but no added NaOH solution, has been shown to result in geopolymers with a compressive strength ranging between 7 to 13 MPa. See Zhang et al., Transp. Res. Rec; J Transp. Res. Board, 2167, 1-9 (2010). Bayer process liquor from the alumina industry has also been used to replace NaOH in the synthesis of geopolymer. See Van Riessen et al., Cem Concr. Compos., 41, 29-33 (2013). The present results of RM1-FC geopolymer confirm that the residual NaOH in the original red mud can be utilized in the geopolymer synthesis. In this regard, the concentration of NaOH solution used for the RM1-FC geopolymer (2.5 M) is far less than the 10 M or more typically required for the fly ash-based geopolymers. See Temuujin et al., J. Hazard. Mater., 167(1), 82-88 (2009); Rattanasak et al., Miner. Eng., 22(12), 1073-1078 (2009); and Chindaprasirt et al., Cem. Concr. Compos. 29(3), 224-229 (2007). However, additional alkaline solution (e.g., hydroxide solution) is needed to acquire useful strength in the red mud-based geopolymer. According to the presently disclosed subject matter, it has been found that adding red mud into the geopolymer also improves its stability and durability compared to the Class C fly ash based geopolymer without red mud. In this regard, a geopolymer derived only from Class C fly ash using same 2.5 M NaOH was cured at the same situation. The expansion cracks occurred on the specimen after 28 days curing, and no compressive strength could be obtained.

The RM2-FC geopolymer uses a slightly higher NaOH concentration of 3.5 M to reach the optimum strength, presumably because there is no residual NaOH left in the red mud after FGD. However, this concentration is still less than that of typical alkaline solutions used for geopolymerization. In FGD, flue gases containing sulphur dioxide ($SO_2$) are passed through the red mud slurry, during which $SO_2$ reacts with NaOH to produce sodium sulfate as follows.

$$2NaOH+SO_2 \rightarrow Na_2SO_3+H_2O \quad (1)$$

$$Na_2SO_3+\tfrac{1}{2}O_2 Na_2SO_4 \quad (2)$$

After FGD, the pH value of the red mud drops (e.g., to 4.5) and the red mud contains a certain amount of $Na_2SO_4$, as shown in Table 1, above. But, as can be further observed from the present results, the compressive strength of the RM2-FC geopolymer at its optimum NaOH concentration was significantly higher than that of the RM1-FC geopolymer (20.3 MPa for RM2-FC vs. 15.2 MPa for RM1-FC). Prior reports have suggested that the addition of $Na_2SO_4$ can increase strength in Portland fly ash cement and blended cements. See Qian et al., Cem. Concr. Res., 31(8), pp. 1121-1127 (2001) and Wu and Naik, Materials Journal, 100(5), pp. 434-440 (2003). Based on the present results, the effect of $Na_2SO_4$ also seems to have a positive effect on the strength of geopolymer derived from high calcium fly ash. Without being bound to any one theory, it is believed that the active calcium in the Class C fly ash can react with $Na_2SO_4$ in a high alkali solution as follows:

$$Na_2SO_4+Ca(OH)_2+2H_2O \rightarrow CaSO_4.2H_2O+2NaOH \quad (3)$$

This reaction can increase the pH of the solution, which is beneficial for the reaction of fly ash under alkaline environment. The consumption of NaOH by geopolymerization further facilitates the reaction in turn and causes more NaOH to be formed. The reaction can also accelerate the dissolution of Class C fly ash and speed up the pozzolanic reaction. See Shi et al., *Alkali-Activated Cements and Concretes*, CRC Press, 2006. Further, the issue of a low pH value for the red mud after FGD can be compensated for by adding additional Bayer liquor. In summary, $Na_2SO_4$ produced by FGD of red mud can be utilized as an activator for geopolymer formation, and can help to provide synergy among the alumina, power plant and geopolymer industries.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A geopolymer composition comprising a reaction product of a reaction mixture comprising an alkaline solution and a solids mixture, wherein the solids mixture comprises red mud and an alumina silicate material, wherein the red mud is a red mud that has been used in a flue-gas desulfurization (FGD) process, wherein the alumina silicate material comprises at least about 10 weight % (wt %) CaO and is selected from the group consisting of Class C fly ash, lime-Class F fly ash, blast furnace slag, and combinations thereof, and wherein the alkaline solution comprises an aqueous solution comprising at least one alkali metal hydroxide, optionally in combination with one or more additional alkaline compound.

2. The composition of claim 1, wherein the alumina silicate material comprises Class C fly ash comprising between about 15 wt % and about 21 wt % CaO.

3. The composition of claim 1, wherein the aqueous solution comprises between about 1.5 moles per liter (mol/L) and about 6.5 mol/L of the alkali metal hydroxide.

4. The composition of claim 3, wherein the aqueous solution comprises between about 2.5 mol/L and about 3.5 mol/L of the alkali metal hydroxide.

5. The composition of claim 1, wherein the alkali metal hydroxide is sodium hydroxide (NaOH).

6. The composition of claim 1, wherein the reaction mixture comprises a weight ratio of alkaline solution to solids mixture of between about 0.4 and about 0.6.

7. The composition of claim 1, wherein the solids mixture has a weight ratio of red mud to alumina silicate material of between about 40:60 red mud:alumina silicate material and about 60:40 red mud:alumina silicate material.

8. The composition of claim 7, wherein the weight ratio is about 50:50 red mud:alumina silicate material.

9. The composition of claim 1, wherein the red mud has a pH of about 4.5.

10. The composition of claim 1, wherein the red mud comprises between about 2 wt % and about 3 wt % $SO_3$.

11. The composition of claim 1, wherein the reaction product is prepared from a reaction mixture comprising a 3.5 M solution of NaOH and a solids mixture comprising red mud that has been used in a flue-gas desulfurization (FGD) process and a Class C fly ash, wherein said solids mixture comprises a red mud:fly ash weight ratio of about 50:50 and the reaction mixture has a solution:solids mixture weight ratio of about 0.5.

12. The composition of claim 1, wherein the reaction product has a compressive strength of at least about 15 megapascals (MPa) at 28 days after curing.

13. The composition of claim 1, wherein the reaction product has a compressive strength of at least about 20 MPa at 28 days after curing.

14. A geopolymer composition comprising a reaction product of a reaction mixture comprising a 2.5 M solution of NaOH and a solids mixture comprising untreated red mud and Class C fly ash, wherein the solids mixture further comprises a red mud:fly ash weight ratio of about 50:50 and the reaction mixture has a solution:solids weight ratio of about 0.5.

15. A method of preparing a geopolymer composition, the method comprising:
   (a) providing a solids mixture comprising an alumina silicate material and red mud, wherein the red mud is a red mud that was used in a flue-gas desulfurization (FGD) process prior to mixing with the alumina silicate material, and wherein the alumina silicate material comprises at least about 10 weight % (wt %) CaO and is selected from the group consisting of Class C fly ash, lime-Class F fly ash, a blast furnace slag, and combinations thereof;
   (b) mixing the solids mixture with an alkaline solution to provide an uncured mixture, wherein the alkaline solution comprises an aqueous solution comprising at least one alkali metal hydroxide, optionally in combination with one or more additional alkaline compound; and
   (c) curing the uncured mixture for a period of time at ambient temperature to provide the geopolymer composition.

16. The method of claim 15, wherein the period of time is at least about 24 hours.

17. The method of claim 15, wherein the alumina silicate material comprises Class C fly ash comprising between about 15 wt % and about 21 wt % CaO.

18. The method of claim 1, where the red mud has a pH of about 4.5.

19. The method of claim 1, where the red mud comprises between about 2 wt % and about 3 wt % $SO_3$.

20. The method of claim 15, wherein the solids mixture has a weight ratio of between about 40:60 red mud:alumina silicate material and about 60:40 red mud:alumina silicate material.

21. The method of claim 15, wherein the alkaline solution comprises between about 1.5 moles per liter (mol/L) of the alkali metal hydroxide and about 6.5 mol/L of the alkali metal hydroxide.

22. The method of claim 21, wherein the alkaline solution comprises between about 2.5 mol/L and about 3.5 mol/L of the alkali metal hydroxide.

23. The method of claim 15, wherein the alkali metal hydroxide is NaOH.

24. The method of claim 15, wherein the uncured mixture has an alkaline solution to solids mixture weight ratio of about 0.5.

25. A cementitious binder mixture comprising:
(i) a solids mixture comprising red mud and an alumina silicate material, wherein the red mud is a red mud that has been used in a flue-gas desulfurization (FGD) process, and wherein the alumina silicate material comprises at least about 10 weight % CaO and is selected from the group consisting of Class C fly ash, lime-Class F fly ash, blast furnace slag, and combinations thereof; and
(ii) an aqueous solution comprising an alkali metal hydroxide.

26. A cementitious mortar mixture comprising the binder mixture of claim 25 and further comprising fine aggregate.

27. A cementitious concrete mixture comprising the binder mixture of claim 25 and further comprising coarse aggregate and/or fibers.

28. A method of repairing an existing concrete or non-concrete structure, the method comprising providing a binder mixture of claim 25, optionally further comprising fine aggregate, and applying said mixture to an existing structure in need of repair.

29. A method of preparing a concrete structure, wherein the method comprises providing a concrete mixture of claim 27 and forming a component or a part of a component of a concrete structure.

30. A geopolymer composition comprising a reaction product of a reaction mixture comprising an alkaline solution and a solids mixture, wherein the solids mixture comprises a red mud that has been used in a flue-gas desulfurization process and an alumina silicate material, wherein the alumina silicate material comprises at least about 10 weight % (wt %) CaO and is selected from the group consisting of Class C fly ash, lime-Class F fly ash, a blast furnace slag, and combinations thereof, and wherein the alkaline solution comprises an aqueous solution of an alkaline compound.

31. A method of preparing a geopolymer composition, the method comprising:
(a) providing a solids mixture comprising an alumina silicate material and red mud, wherein said alumina silicate material comprises at least about 10 weight % (wt %) CaO and is selected from the group consisting of Class C fly ash, lime-Class F fly ash, a blast furnace slag, and combinations thereof, and wherein said red mud is red mud that has been used in a flue-gas desulfurization process;
(b) mixing the solids mixture with an alkaline solution to provide an uncured mixture, wherein the alkaline solution comprises an aqueous solution of a water-soluble alkaline compound; and
(c) curing the uncured mixture for a period of time at ambient temperature to provide the geopolymer composition.

32. A cementitious binder mixture comprising:
(i) a solids mixture comprising red mud and an alumina silicate material, wherein the red mud is a red mud that has been used in a flue-gas desulfurization process and wherein the alumina silicate material comprises at least about 10 weight % CaO and is selected from the group consisting of Class C fly ash, lime-Class F fly ash, blast furnace slag, and combinations thereof; and
(ii) an aqueous solution comprising an alkaline compound.

* * * * *